UNITED STATES PATENT OFFICE.

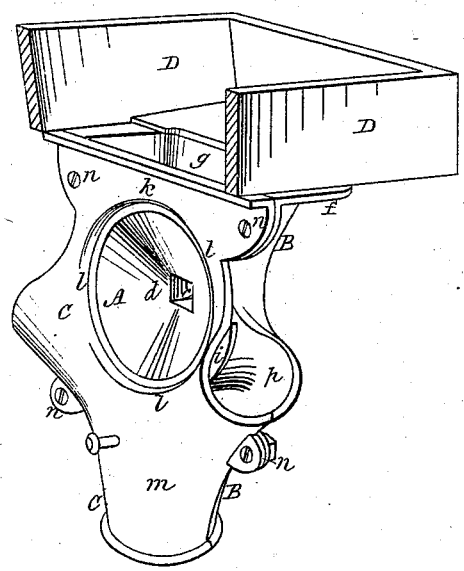

CHARLES F. JOHNSON, JR., OF OWEGO, NEW YORK.

IMPROVEMENT IN GRAIN-DISTRIBUTERS FOR SEED-DRILLS.

Specification forming part of Letters Patent No. 169,813, dated November 9, 1875; application filed June 17, 1875.

*To all whom it may concern:*

Be it known that I, CHARLES F. JOHNSON, Jr., of Owego, in the county of Tioga and State of New York, have invented certain new and useful Improvements in Seed-Distributers for Grain-Drills; and I do hereby declare the following to be a full, clear, and exact description of the same, reference being had to the accompanying drawings, making a part of this specification, in which—

Figure 1 represents, in perspective, an exterior view of one of the distributers as attached to the seed-box or hopper. Fig. 2 represents a vertical transverse section through the same. Fig. 3 represents a vertical transverse section taken through the plane of the joint of the two shells, and representing the seed-wheel in full. Fig. 4 represents, in perspective, the shell as seen in Fig. 3, the seed-wheel being removed.

My invention relates to a seed-distributer for grain-drills, in which a one-part wheel, having a high, dish-like flange and a fluted hub, is incased in and adapted to a two-part shell or casing, so that three castings or pieces constitute the whole distributer, thus making it very simple, easily cast, and readily fitted and applied to a seed-drill, as will be explained.

To enable others skilled the art to make and use my invention, I will proceed to describe the same with reference to the drawings.

The seed-wheel A is of a bowl or dish form, having a flange, $a$, a hub, $b$, a shaft-opening, $c$, a recessed or concave back, $d$, and eccentric flutings $e$, wrought and cast upon or with it, and constituting but one single piece. One of the shells or casings—namely, B—is cast with a flange, $f f'$, by which it is secured to the seed-box D, an auxiliary hopper, $g$, an opening, $h$, for the hub of the seed-wheel to project through, a flange or curb, $i$, and one-half, $j$, of the spout, into which the grain drops from the seed-wheel, and from whence it is carried by a tube, in the usual way, to the shoe and into the ground.

The other shell or casing, C, is made and cast with a portion, $k$, that forms one of the sides of the auxiliary or secondary hopper $g$, an opening, $l$, somewhat less in diameter than the extreme diameter of the seed-wheel, and the remaining portion $m$, which, when the two parts are put together, completes the spout, into which the grain falls from the seed-wheel, and is conducted into the ground, as above stated. The shell or casing C is united to the casings B by bolts passing through the openings or holes $n$ $n$ in each.

I have described the flutings $e$ as being eccentrically made on the seed-wheel, and so prefer them; but they may be radial, and have intermediate depressions or shallow cells $o$ between them.

It will be perceived, by reference to Figs. 2 and 3, that the flange $a$ of the seed-wheel comes well up into the secondary hopper $g$, and that the flutings and cells extend nearly to the perimeter of the flange, so that that part of the seed-wheel acts as a stirrer to prevent the grain from bridging or clogging in the throat of the secondary hopper $g$.

The grain carried around by the flutings of the seed-wheel must pass to the end of the curb $i$ before it can drop, and when it reaches that point it falls into the spout, whence it is carried to the ground in the usual way.

On the rear of the casing is made an opening, $p$, into which a fertilizer from another box or hopper on the machine may be introduced, and, mingling with the grain after it has passed the seed-wheel, be carried to the ground with it, and deposited there.

A square shaft, driven from the ground wheel or wheels of the seed-drill, may pass through the square openings $c$ of the seed-wheels, of which there may be a series, connected with the hopper in the usual well-known way.

Having thus fully described my invention, what I claim is—

In a seed-distributer for grain-drills, the combination of the seed-distributing wheel A, with its flutings $e$, and a flange, $a$, extending high up into the auxiliary hopper $g$, with the casings B C, for forming a support for the wheel, and, with said wheel, constituting the auxiliary hopper above, and the curb $i$, and terminating in a seed-conductor below, as and for the purpose described and represented.

CHARLES F. JOHNSON, JR.

Witnesses:
B. C. STILES,
THEO. D. LERE.